United States Patent [19]

Craven et al.

[11] Patent Number: 5,495,429
[45] Date of Patent: Feb. 27, 1996

[54] METHOD AND APPARATUS FOR MEASURING THE COLOR OF THREE DIMENSIONAL OBJECTS

[75] Inventors: Robert P. M. Craven; William K. Preece; James E. Smith, all of Morgantown, W. Va.

[73] Assignee: West Virginia University, Morgantown, W. Va.

[21] Appl. No.: 376,469

[22] Filed: Jan. 20, 1995

Related U.S. Application Data

[63] Continuation of Ser. No. 17,191, Feb. 12, 1993, abandoned.

[51] Int. Cl.[6] .................................................. G01J 3/30
[52] U.S. Cl. .................................. 364/526; 382/162
[58] Field of Search ......................... 364/526; 395/119, 395/131, 133; 209/536, 541, 576, 580; 250/390.07, 553, 206.2, 227.3, 226; 382/17, 23, 25, 28

[56] References Cited

U.S. PATENT DOCUMENTS

| | | | |
|---|---|---|---|
| 4,028,728 | 6/1977 | Sharp | 358/107 X |
| 4,041,286 | 8/1977 | Sanford | 358/107 X |
| 4,379,308 | 4/1983 | Kosmowski et al. | 358/101 X |
| 4,505,589 | 3/1985 | Ott et al. | 364/526 OR |
| 4,694,356 | 9/1987 | Constable | 358/332 OR |
| 4,736,245 | 4/1988 | Seto et al. | 358/76 |
| 4,802,107 | 1/1989 | Yamamoto et al. | 364/525 |
| 4,812,904 | 3/1989 | Maring et al. | 358/107 OR |
| 4,833,533 | 5/1989 | Augusti et al. | 358/80 OR |
| 4,839,718 | 6/1989 | Hemsky et al. | 358/22 OR |
| 4,893,180 | 1/1990 | Shigaki et al. | 358/80 OR |
| 4,965,663 | 10/1990 | Sasaki | 358/80 OR |
| 4,965,664 | 10/1990 | Udagawa et al. | 358/80 OR |
| 4,970,584 | 11/1990 | Sato et al. | 358/75 OR |
| 5,159,185 | 10/1992 | Lehr | 250/205 X |
| 5,166,755 | 11/1992 | Gat | 356/419 OR |
| 5,170,222 | 12/1992 | Street | 356/328 OR |
| 5,317,648 | 5/1994 | Sawada et al. | 364/526 |

Primary Examiner—Emanuel T. Voeltz
Assistant Examiner—Thomas Peeso
Attorney, Agent, or Firm—Arnold B. Silverman; Kirk D. Houser; Eckert Seamans Cherin & Mellott

[57] ABSTRACT

A method for measuring color of objects comprises storing in a computer memory values representative of measurements of the color of an object over a range of angular positions with respect to a photosensor, selecting a measurement area of the object, determining a geometrical structure of the measurement area, and adjusting the measured color in response to the stored values. An associated apparatus is also provided.

55 Claims, 6 Drawing Sheets

METHOD AND APPARATUS FOR MEASURING THE COLOR OF THREE DIMENSIONAL OBJECTS

This application is a continuation of application Ser. No. 08/017,191, filed Feb. 12, 1993, now abandoned.

BACKGROUND OF THE INVENTION

1. Field of the Invention

This invention relates to a precise method to accurately measure the color of three dimensional non-specifically oriented objects and an associated apparatus.

2. Description of the Related Art

Color is a characteristic of human sight that is based on the wavelength composition of light which is reflected from an object to the eyes. The light is measured photochemically by small sensors on the retina of the eyes. The eye has some receptors or sensors which are rods and others which are cones. The cones mediate all color vision. These cones are divided in to three basic categories, each responsive to distinctive overlapping portions of the visible light spectrum. These three categories of sensors are referred to by their dominant wavelength sensitivities in the red, green, and blue portions of the spectrum. The simultaneous perception of a triad of sensors (tristimulus) causes humans to perceive colors for which there is no corresponding monochromatic wavelength. Variations in an individual's rods and cones may cause a given color to be perceived differently from person to person. In order to allow colors to be analyzed accurately, it is necessary to have a system which accurately and reliably determines object color.

It is important in color measurement to have a good light source that facilitates effective color determination.

Only a small percentage of humans possess the color acuity for discriminating slight color variations. Instruments have historically employed a very diffuse lighting when measuring color in order that no directional source of light can affect the apparent color of an object. It has been known to attempt to duplicate human color vision in automated equipment.

There have been two principal strategies for measuring color of an object by apparatus other than the human eye. One approach is to measure the ratio of reflected light to incident light with respect to the object for each wavelength, or for many groups of wavelengths, in the visible spectrum. The resulting reflectance data is unique for each color. Instruments of this type, however, do not exhibit the same sensitivity response to colors as humans and, therefore, are of limited use in determining how closely a human will perceive the difference between two colors. The other measuring strategy attempts to mimic human sight by employing tristimulus colors similar to the red, green, and blue sensors in human eyes. Standard color systems have been devised which reflect the average responses of many people. A video camera is an example of such a standard color system.

A limitation common to human sight and video camera sensitivity alike is that some colors appear the same in one light but different in another. Because only three sensors are employed, different wavelengths of light within a sensor's band of sensitivity stimulate the sensor similarly.

It has been known to measure color by obtaining a flat homogeneous sample of the colored material and presenting it to a port of, for example, a spectrophotometer. Spectrophotometers typically employ diffuse lighting and measure an average color of the object viewed through the entire field. Spectrophotometers directly measure the reflectance spectrum of a two dimensional object and compare it with the incident spectrum. This apparatus is not suitable for use in determining surface color on a complex, non-planar geometric surface.

There remains, therefore, a need for a system to provide accurate color measurement of a non-planar surface and more particularly there is need for such a system which does not require particular surface orientation.

SUMMARY OF THE INVENTION

The present invention has met the above need. The method and associated apparatus for measuring color of objects comprises storing in a computer memory values representative of measurements of the color of a planar object with a camera over a range of angular positions with respect to a color photosensor, such as a color video camera, selecting a measurement area of the test object, determining a geometrical structure of the measurement area and measuring the color of the measurement area and adjusting the measured color in response to the stored values at a corresponding angle.

The apparatus of the invention comprises a photosensor means and illuminating means, geometrical determining means, and computer means. The illumination means illuminates at least a portion of the object and the photosensor means which is coupled with the computer means views at least a portion of the object. The computer means digitizes the color of the object to provide a measurement array of the viewed portion of the object. The measurement array then is adjusted based on the geometrical determining means determination of the structure of the viewed portion of the object with respect to data stored in memory means within the computer means.

It is, therefore, an object of the present invention to provide a method and apparatus for the automated measurement of the color of three dimensional objects.

It is a still further object of the present invention to allow measurement of color of a nonplanar surface which does not need to be oriented in any specific manner.

Another object of the present invention is to provide means for determining the acceptability of an object's color relative to a standard.

It is an object of the present invention to provide such a system which will be capable of reliable and precise color measurement in a wide variety of industrial quality control applications, as well as other uses.

It is a further object of the present invention to facilitate economic color inspection of three dimensional components, materials in process, and products.

These and other objects of the invention will be more fully understood from the following detailed description of the invention on reference to the illustrations appended hereto.

DESCRIPTION OF THE PREFERRED EMBODIMENTS

As used herein, the term "color photosensor" shall mean apparatus for converting an optical image received by a camera to corresponding image information which may be an electrical signal, an optical signal, a radio signal, or other information conveying signal. The output image information will be proportional to the light intensity incident on the camera sensor. An array of such sensors can convert an image received by a video camera or other equivalent apparatus into a corresponding video signal. Multiple arrays of sensors, or interlaced sensor elements, with sensitivity to various bands of the visible spectrum permit color information to be encoded in the video signal. Color sensitivities may readily be achieved by filters, for example. The use of such filters shall be deemed to fall within this definition as used herein.

Figure 1:
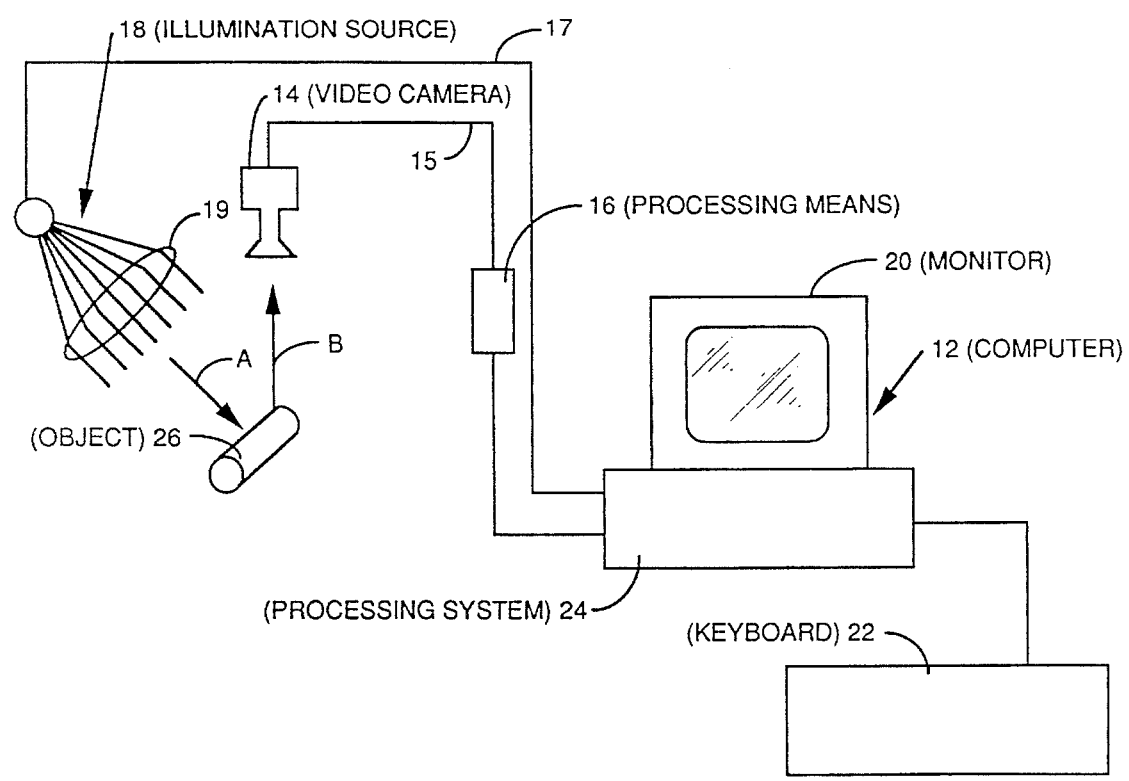
FIG. 1 is a schematic view of an embodiment of the apparatus of the invention.

The apparatus in accordance with the invention is shown generally in FIG. 1. The apparatus comprises a computer 12, a color photosensor, such as a video camera 14, and an illumination source 18. Interposed between video camera 14 and computer 12 in electrical line 15 is processing means 16 which may include digitizing means to convert the electrical image information to digital information. These digitizing means may be an analog to digital converter. An analog to digital converter, such as a frame grabber, may be employed in the processing means 16 and may be provided within the computer 12. The computer 12 may include a monitor 20, a keyboard 22, and a processing system 24, wherein the processing system includes memory and a frame grabber board. An object 26 to be measured is also shown.

The processing means 16 may include means for sensing surface orientation of the object of interest and shall expressly include, but not be limited to laser range finding means, sonar range finding means, stereo imaging means, known geometry perspective means, texture gradients, shadows, Moire fringe patterns and structured lighting, as will be known to those skilled in the art. In the specific examples provided herein, the examples employ a structured lighting technique consisting of projected lines which define planes. The intersection of these planes and the object to be inspected are imaged by the color photosensor system and the three dimensional spatial orientations are incorporated by known geometric principles.

The use of a color photosensor, such as a video camera 14 as a light sensor provides an image of an object or portion of an object, similar to what a human eye might see. A suitable video camera is of the 3-chip CCD type and is sold by Sony Corporation under the trade designation DXC-750/MD. The computer 12 can be used to interpret three dimensional properties of the image much as a human does. In the form illustrated, the image viewed by video camera 14 is delivered as electrical signals by wire 15 to processing system 24.

One of these properties is intensity which can appear to change when viewed at varying angles. Many parameters affect the apparent color of an object and a useful color measurement system should provide a consistent color measurement for each separate color of an object. As the apparent color of an object changes based on its angle of illumination and its angle of viewing, these factors must be taken into account in any final color measurement assessment. Also, each material has its own surface reflectance properties that are effected by the object's surface finish and these should be considered as well.

We have determined that the following are among the major categories of factors that can influence the measured intensity of a digitized color. They are: (1) illumination influences; (2) object influences; (3) lens influences; (4) photosensor influences; and (5) digitizer influences.

The illumination factors may include incident angle of light, spectral power distribution, spatial intensity distribution, and illumination variation over time.

Object influences include geometry, reflectance, and spectral response.

Among the lens influences are aberrations, diffractions, spectral response and lens system parameters.

Photosensor influences include sensor orientation, light intensity response, non-linearity, electronic noise, spectral response of gels, chip spatial sensitivity and sensor parameters.

The digitizer influences include MD converter non-linearity, round-off error, synchronization error and electronic noise.

The present system has employed the foregoing factors in providing an effective means for measurement of color in three dimensional, non-specifically oriented objects.

The illumination source 18 is energized by wire 17 which, in the form shown, is secured to processing system 24. The illumination source 18 for the disclosed method can be any suitable source such as a diffuse source such as an integrating sphere (not shown), or a single or multiple direct source such as a parabolic reflector or elliptical reflector (not shown), or a collimated light source as shown in FIG. 1 having collimator 19 interposed between light source 18 and object 26. Because the lighting of the viewed area of the object 26 by beam A affects the color perceived by the video camera 14 through beam B, several factors need to be considered when choosing an illumination source. The factors to be considered include the incident angle of light on the objects, possible shadows, the spectral or spatial distribution of the light, spectral distribution, and illumination variation of the light over time. In general, the more complex angles anticipated in the illuminated surface of object 26, the more diffuse the light source should be.

Once an appropriate illumination source 18 has been chosen, it should be consistent spatially with respect to the video camera 14 and have good color rendering capabilities. An illumination source 18 with a flat spectral power distribution (SPD) curve assists video camera 14 in distinguishing colors equally well over the whole visible spectrum. The presence of a spike in the SPD curve indicates radiant power is concentrated to a larger extent in this region of the spectrum, while some other region will then be deficient. The camera 14 is capable of distinguishing color in the region of the spike relatively well, but if a color falls in the weak region the camera's sensitivity is lessened with respect to changes in color in this region. The more spikes in the SPD curve, the poorer the quality of the light source.

Figure 2:
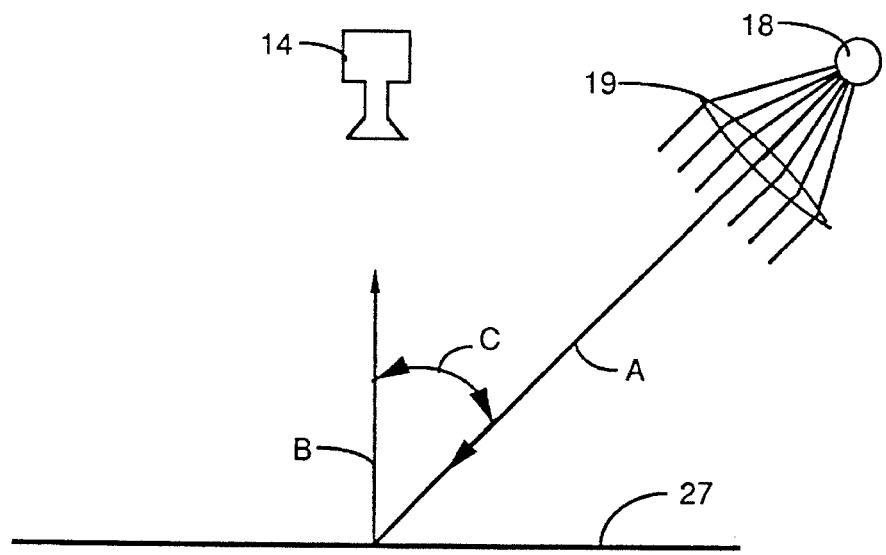
FIG. 2 is a schematic diagram illustrating the incident angle of light.

With reference to FIG. 2, in effecting calibration of the system, a planar sample (or a non-planar sample of known geometry) of similar surface finish, material and color, that is to be tested, is selected. Preferably, a series of measurements are taken of the planar sample at different angles C with each measurement to be stored in computer 12 in association with the specific angles for future use during testing of an object 26. The software employed in effecting such calibration will be readily known to those skilled in the art.

While calibration could be achieved by employing a known object with known surface orientations, such as a sphere with a similar surface finish for material and color to that of the test object, such an approach is more sensitive to convolution errors and, therefore, is not as preferred as the planar sample approach.

The incident angle C (as shown in FIG. 2) is defined as the angle between a light ray A and the beam B which is normal to a planar surface 27 of the sample. The optimum incident angle is related to the reflective characteristics of the target sample. Therefore, the incident angle is optimized by minimizing the specular reflections from the target sample to the light sensor on video camera 14. The incident angle of all the light rays can be the same if a collimated light source is used as shown in FIG. 2. The sample should be prepared similarly so that it will have the same surface characteristics as that of the object to be measured. In general however, if the precision of the colorimetric measurements is not critical, various types of objects can be classed together as to their angular reflectance properties, such as plastics, east metals, polished metals, and the like.

The flat sample is placed on a goniometric device so that it's reflection intensity can be measured at many orientations to the illuminations source 18 and to the camera 14. These values are placed in computer 12 memory for later reference, either by direct lookup, interpolated lookup, or by fitting a general equation through the data.

Another factor to be taken into account when choosing an illumination source 18 is the color rendering index (CRI). As those skilled in the art know, CRI is a system that compares how a light source shifts color of a control sample as compared to a reference source of the same chromaticity as the light source. Also the luminosity of a light source, or lamp 18 must be sufficient to allow the video camera 14 to distinguish color properly. If the source 18 is of a low luminosity, the reflected radiant energy may not produce sufficient excitation voltage in the camera 14 and this in turn severely reduces the camera's sensitivity to changes in color. Also, if the light source 18 has a low luminosity, then lighting external to the system may undesirably influence the video signal, which reduces the signal-to-noise ratio and, therefore, introduces error into the system which cannot quantitatively be determined. Generally, the farther away light source 18 is from the object 26, the more powerful it should be. There also is art upper limit to the luminosity of the light source 18 because the radiant energy above a vermin level may saturate camera 14, thus rendering changes in color undetectable.

Two other factors in the selection of light source 18 include the consistency of a lamp's lumens and spectral intensity distribution over a period of time. Both of these factors tend to change over time, and hence system calibration to nullify this change is preferred. This calibration for illumination source 18 can be employed through the use of color feedback of some control object in the image to allow for color correction. Variation in the signal from the control object may be employed to re-calibrate each image.

Figure 3:
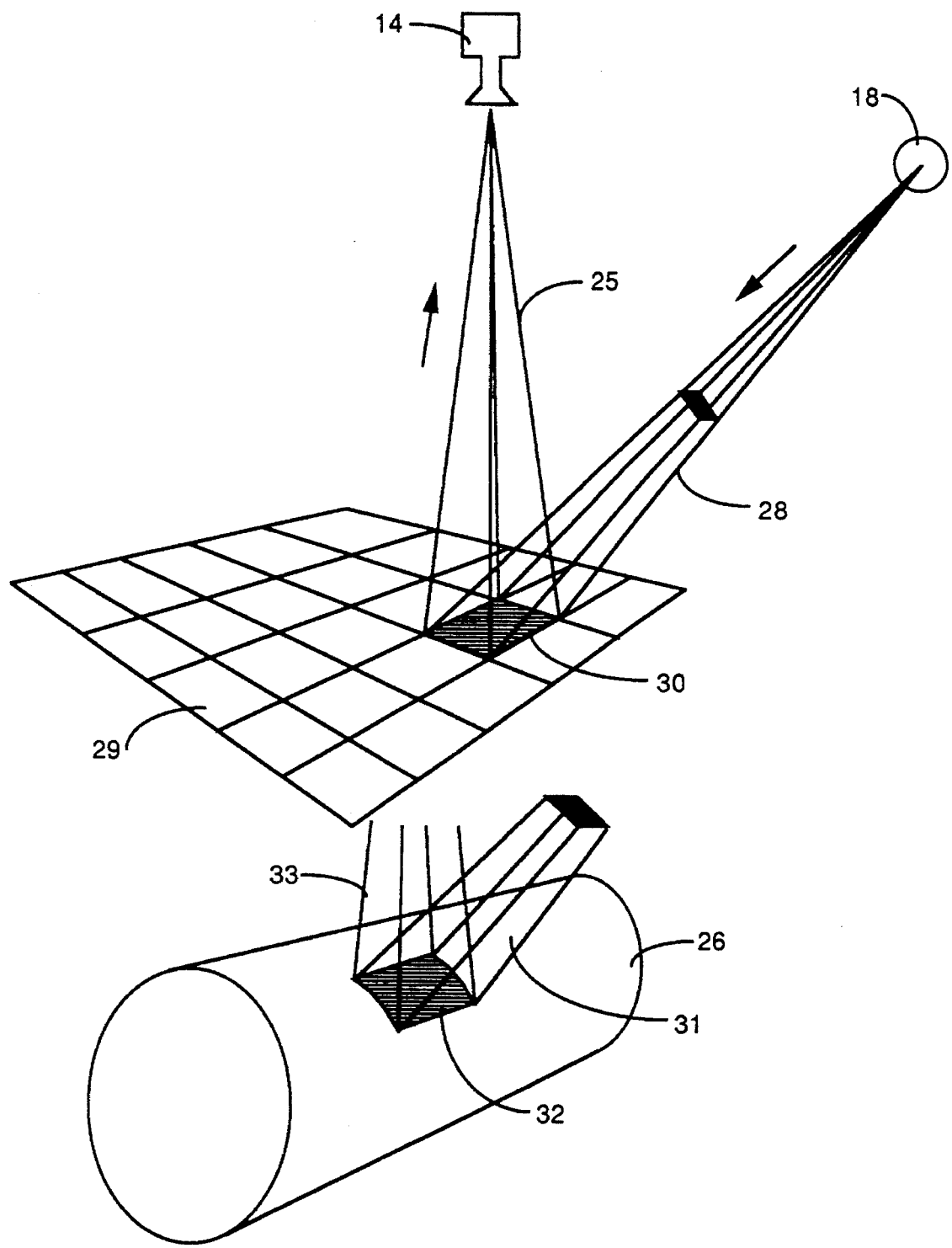
FIG. 3 illustrates schematically the calibration for an area of an object represented by a single pixel in accordance with the invention.

The spatial intensity distribution is a measure of the consistency of illumination in a plane orthogonal to the optic axis of the camera 14. The spatial intensity distribution is effected by the light source 18 and the camera 14 used to manipulate the light. The spatial distribution of the light source should preferably be constant over the illuminated portion of object 26. If it is not, this may be compensated for by measuring the spatial illumination distribution as the light source 18 illuminates a flat homogeneous surface, such as surface 27. The array of digitized numbers resulting from this measurement are used to weight measurements of objects on a constant area of illumination basis. This compensation takes place after 3D information of the object is known in order to determine the 3D surface area imaged by each pixel of interest (see FIG. 3). The compensation for each pixel can be defined by the equation:

$$I_{corr\,(i,j)} = I_{meas\,(i,j)} \frac{(I_{cal\,avg})(\text{Area}_{3d\,pixel\,facet\,(i,j)})}{(I_{cal\,(i,j)})(\text{Area}_{cal})} \quad (1)$$

Where:
$I_{corr}$=illumination intensity compensated for spatial distribution,
$I_{meas}$=measured illumination intensity,
$I_{cal\,avg}$=average illumination intensity of the calibrated illumination area of FIG. 3.
$\text{Area}_{3D\,pixel\,facet}$=area of 3D surface of a pixel,
$I_{cal}$=illumination intensity of the calibrated illumination area, and
$\text{Area}_{cal}$=area of calibrated illumination area of FIG. 3.
(i,j)=the pixel coordinate for the ith row and jth column of the sensor array.

The calibrated light beam 28 on the planar sample 29 provides pixel 30 which is viewed by video camera 14. In testing object 26, the light beam 31 will impinge on surface area 32 and deliver reflected light beam 33 to camera 14. Reflected light beam 33 results in intensity measurement $I_{meas}$ of equation (1). Area 32 relates to $\text{Area}_{3D\,pixel\,facet}$ in equation (1). $I_{cal}$ is the intensity reflected from area 30 identified in FIG. 3 as ray 25. Area 30 is $\text{Area}_{cal}$ of equation (1).

After calibration, one considers the influences of the object on the measured image. The factors which are involved include the object geometry, reflective properties and the spectral response of the object. In order to determine these effects and compensate for them, a 3D geometrical configuration of the viewing area or the entire object must first be obtained.

Figure 4:
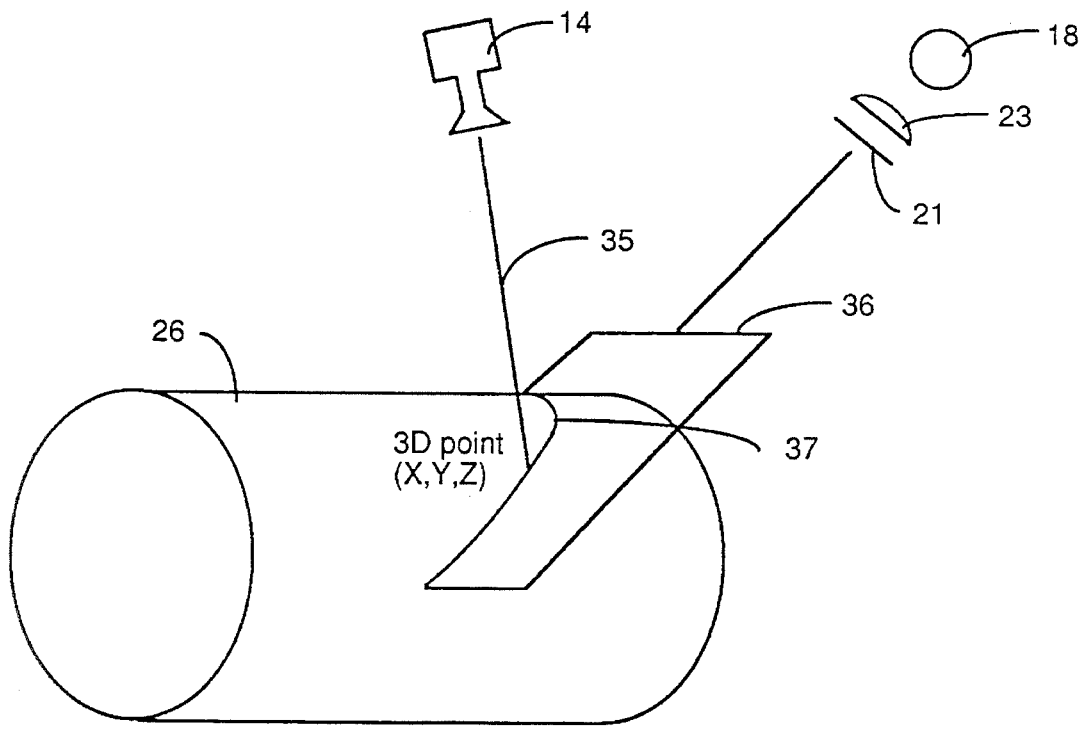
FIG. 4 illustrates schematically a preferred method of determining the geometrical configuration of a portion of an object.

Of the many techniques available for determining 3D, range information, the technique of projecting lines has the advantages of simplicity, while avoiding the higher cost of more precise techniques such as laser range finding. Therefore, this approach is considered as a preferred embodiment and will be described herein, although various circumstances, tolerances, and object complexities may require that an alternative range finding method be employed on other systems in accordance with the invention. FIG. 4 shows a structured lighting technique for measuring surface orientation of a test object 26. The collimated light source 18 is modified to project stripes or lines (or a grid) onto the test object 26. The projection of each line represents a plane in 3D space. The camera 14 observes by beam 35 the intersection 37 of this plane with the test object 26 and through geometric principles the computer 12 can readily compute the 3D surface orientations. In the form illustrated, a lens 23 and a transparent filter 21, having the line to be projected as a plane 36, is provided. When the plane 36 intersects an object 26, it is projected on it, the resulting projection represents the intersection 37 of the projecting plane 36 and the object 26. Many such lines can be projected upon an object 26 or a single line can be scanned if the object is stationary. If many lines are projected it is important to identify the lines to alleviate any correspondence problem in the image. This can be accomplished by color coding the lines or by imposing a code of dots-dashes, long dashes-short dashes, or the like, upon each projected line.

For each projecting plane 36 the equation of the plane is in general, $$aX+bY+cZ=d \qquad (2)$$

and is subject to illumination source orientation to any meaningful coordinate system. A ray corresponding to a single pixel of the camera image is represented in 3D space by 2 equations.

$$Z=eX+f \qquad (3)$$

and $$Z=gY+h \qquad (4)$$

For each pixel in the image that corresponds to a projected line, a 3D point (X,Y,Z) can be computed, by solving for X,Y and Z in equations (2)–(4) ultimately yielding a 3D representation of the object. The number of 3D points that can be computed are limited only by the number of projected lines and the resolution of the camera 14.

The spectral response of the object 26 to the total illumination is what is measured when color is determined in accordance with the invention. The measurement is not in the form of intensity with respect to light wavelength, as with a spectrophotometer, but rather is broken into three values named after their dominant wavelengths, red, blue, and green (RBG). Each of these values is calculated and preferably compensated for the influences disclosed herein. This is a valid scheme for color measurement because it is similar to the way human perception works. The final judge of color is in fact the human observer, and human sensitivities to various color difference are quite different from that of a spectrophotometer.

Camera 14 includes an optic system which focuses an image of the target scene of object 26 on the camera sensor. The optic system consists of a set of lenses used to form an image and a variable aperture which controls the amount and the area of the lens through which light passes. To develop an understanding of the error the lens system imparts on the image projected onto the sensor of camera 14, it is desirable to briefly review some basic known optical principles.

Figure 5:
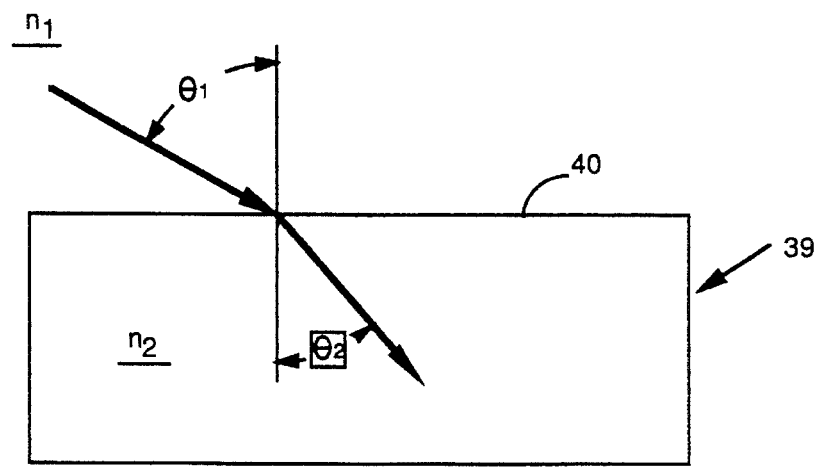
FIG. 5 illustrates schematically the effects of Snell's law on a light ray.

The two primary optic principles which govern the operation of a lens system are refraction and diffraction. Refraction, as shown in FIG. 5, is the phenomenon in which the direction of a light ray is changed, or bent, as the ray passes from one medium, $n_1$ to another, $n_2$ as in object 39. The change in direction is determined by the use of Snell's Law:

$$n_1 \sin\theta_1 = n_2 \sin\theta_2 \qquad (5)$$

wherein n is the refractive index of a medium and is the angle of the light ray relative to the surface normal to the surface 40. The subscript 1 denotes the first medium and subscript 2 denotes the second medium.

The "sin θ" term of Snell's Law may be approximated by the Taylor expansion of sin θ.

$$\sin\Theta = \Theta - \frac{\Theta^3}{3!} + \frac{\Theta^5}{5!} - \frac{\Theta^7}{7!} + \frac{\Theta^9}{9!}\ldots \qquad (6)$$

For small angles wherein the light is restricted to a narrow region about the optic axis, or paraxial region the "sin θ" term may be approximated by θ. This approximation leads to the first-order or paraxial theory of refraction $$n_1\theta_1 = n_2\theta_2. \qquad (7)$$

Deviations between the actual refraction and that predicted by the paraxial theory are known as aberrations. Aberrations may be divided into monochromatic aberrations and chromatic aberrations. Monochromatic aberrations which deteriorate, or blur, the image include spherical aberration, coma, and astigmatism. Petzval field curvature and distortion are monochromatic aberrations which deform the image.

Spherical aberrations refer to the difference between focal points of the paraxial and marginal rays. In general, the farther from the optic axis a ray enters the lens, the shorter the focal point. The technique preferably used to compensate for spherical aberrations is to combine two lenses with nearly equal but opposite aberrations into what is commonly referred to as a "doublet" or to use an aspheric lens. Common image correction may also be used.

When off axis, parallel light rays pass through a lens, the marginal rays are refracted more or less than but not the same as paraxial rays. Coma appears as a difference in the image magnification as a function of location in the focal plane. This results in a blurring of off-axis object points in the focal plane. Preferably, coma is corrected by using multiple lenses or by varying the placement and size of an aperture to minimize the marginal rays which pass through the lens.

Astigmatism is another aberration which arises because the object point is not along the optical axis. The effect of astigmatism is that the off-axis object point is never fully focused in a single plane. Astigmatism may be minimized by decreasing the angle of the object point with respect to the optical axis. This is accomplished either by keeping the object of interest close to the optical axis or increasing the distance from the object to the lens.

"Petzval field cuntature" refers to the tendency for a lens to focus better on a curved surface instead of a plane. As those skilled in the art are aware, the Petzval surface curves towards positive lenses and away from negative lenses. Preferably, Petzval field curvature aberrations are normally corrected by combining a positive and a negative lens with the same refractive indices and the same focal lengths.

Different areas of a lens may have different focal lengths and magnification. This leads to distortion. Distortion is a misshapening of the object image but where each point in the image plane is in focus. Distortion is usually controlled by aperture placement. If a single thin lens is employed, the aperture is placed adjacent the lens. If, preferably, a lens system is used, the aperture is placed in the center of two identical lenses.

Chromatic aberrations arise because the refractive index n is a function of the wavelength of the light. Based upon Snell's Law (Eq. 5), light rays of different wavelengths are refracted to a different degree. The refractive index for most optical materials decreases as a function of wavelength. Based upon the thin-lens equation, $$\frac{1}{f} = (n-1)\frac{l}{R_1} - \frac{l}{R_2} \qquad (8)$$

the focal length f will increase as a function of wavelength and $R_2$ and $R_2$ are radii of curvature of the lens.

Figure 6:
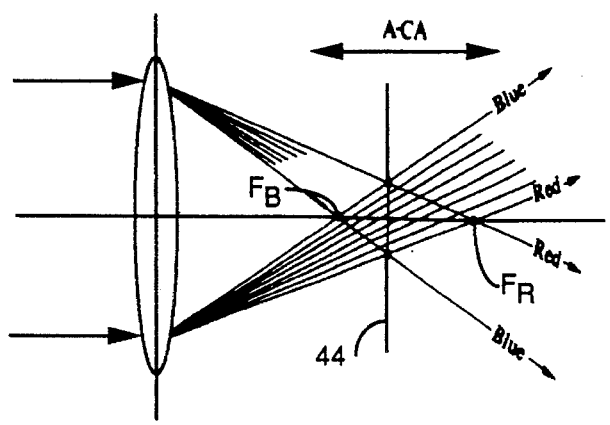
FIGS. 6 and 7 illustrate schematically chromatic aberrations which may occur in lenses.
Figure 7:
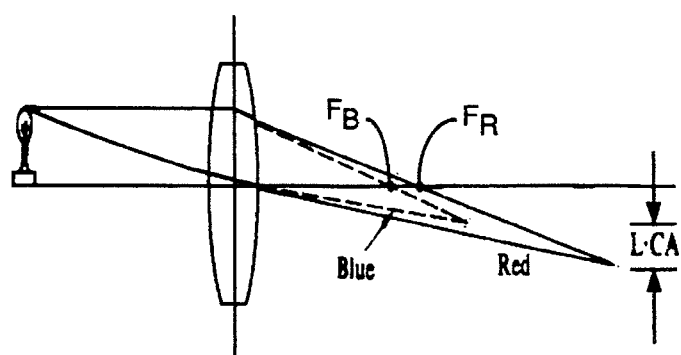

FIGS. 6 and 7 illustrate the two classifications of chromatic aberration, axial and lateral, respectively. The axial chromatic aberration (A-CA) for a collimated white light is defined as the distance between the focal points of two colors of known wavelength (usually blue and red). These points are shown in FIG. 6 as $F_B$ and $F_R$. The plane of least confusion 44 is the region along the optical axis where the best image is formed.

The vertical distance between the image heights of two colors is known as lateral chromatic aberration (L-CA) as seen in FIG. 7. The chromatic aberration for off-axis points, appears as a frequency dependent transverse magnification.

Chromatic aberrations are preferably minimized by combining a positive and a negative thin lens so that the red and blue focal points, $F_R$ and $F_B$, are coincidental. In this way, the lens system has been achromatized for these two colors and is commonly known as an achromatic doublet. It is possible, but uncommon, to achromatize three or even four wavelengths. Even though the chromatic aberration has been removed for two or more discrete wavelengths and minimized for the remainder of the visible spectrum, it is generally not possible to remove all of the chromatic aberration of a lens system. Known image correction or a mirror imaging system is preferably used to correct for chromatic aberrations.

Most commercially available cameras 14 offer many features, such as variable focus, zoom, and aperture, which allow great flexibility in many applications. The variabilities in the lens system though, make it extremely difficult to minimize aberrations. Therefore, preferably once the operational parameters of an on-line inspection system, such as focal length, aperture, and magnification, are determined, a customized fixed lens system is developed for the application. After the lens is acquired, the effect of the remaining aberrations on image data are modeled and stored in the memory of computer 12 previous to data collection. This model is then used to remove undesired lens effects from the data image by means of the computer 12.

In general, many types of aberrations can be minimized or eliminated through careful lens selection and by always imaging the object of interest near the optic axis. Other aberrations can be measured by imaging precision targets, (checkerboards, radial patterns) and measuring edge positions to subpixel accuracy. A technique to enhance this measurement is to move the camera in subpixel increments with an XY positioner and note changes in the edge detection position. The integer X-Y positions intrinsic to the pixel array are then replaced with a floating point representation which reflects these subpixel spatial deviations. As those skilled in the art recognize chromatic aberrations are the most important for this application and, therefore, the response of the individual red, green, and blue channels must be measured independently.

The next area of concern for lens influences is diffraction. The lens system through which humans perceive the world, the eye, is not perfect. Neither, are the lens systems of camera 14, although these imperfections are not related to their manufacture, but are rather a limitation of optics themselves and the way that light interacts with matter. Diffraction, aperture effects, and even aberrations in the lenses themselves all cause perception by any detection means to be somewhat blurred. Further compounding this blur in video cameras is the response of the electronics. The following is a description of the phenomenon hereinafter termed "blend". The smearing of a step edge is used as an example, however, blend manifests itself in the measurement of any varying light intensity image such as that produced by object 26. An image may be "de-blended" by either solving many simultaneous equations or "deconvoluted" using Fourier transformations.

The term "blend" is used to explain the blurring which occurs at the edge of an object in an image. It should be understood, however, that the entire image is blended and that the effects of the blending are only readily apparent at large changes in image intensity. The phenomenon of blend is documented in available literature under the name "convolution," a term used in general signal processing. Blend is more descriptive of the phenomenon manifested in an image and is therefore used predominately herein.

Blend is not a critical consideration in the measurement of flat surfaces, but becomes more important when the image intensity varies, such as in cylindrical object 26. The foremost cause of blend is generally the optics. The response time of the electronics can aim cause blend if a step change in the image can not be realized quickly enough in the video signal. The effects of this electronic lag are minimized by digitizing at equal or lower resolution than the cameras capabilities.

Figure 8:
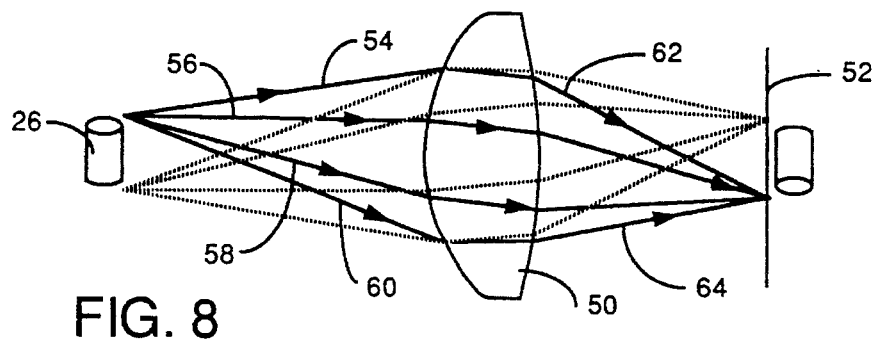
FIG. 8 illustrates schematically a simple lens imaging an object onto a plane.

The treatment of lenses in this description need not be detailed as those skilled in the art are familiar with this technology. FIG. 8 illustrates a simple lens 50 imaging object 26 onto a plane 52. This plane 52 could be camera film, a CCD sensor element of camera 14, or the retina of the human eye.

Figure 9:
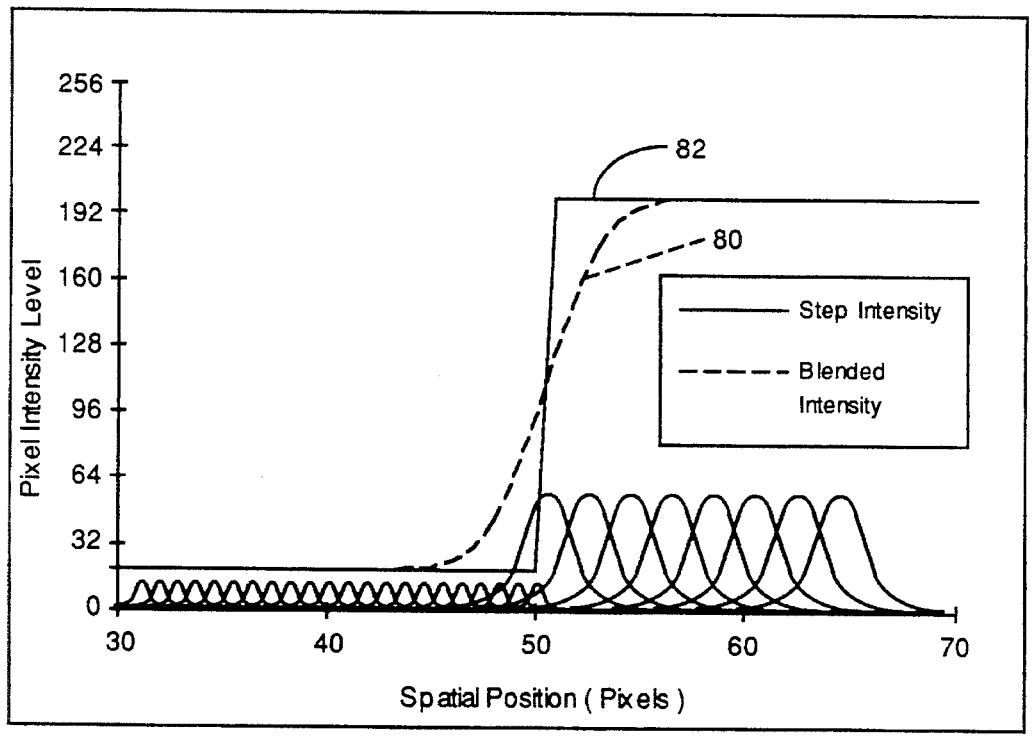
FIG. 9 illustrates schematically blending of a step edge input of light intensity.

The concept of an infinite number of light rays 56, 58, 60, 62, emanating from each point on the object 26 and diverging outward only to be refracted at each lens interface, and ultimately to converge again on the focal plane of the CCD sensor element of camera 14, is a geometricly valid simplification of the actual wave phenomenon. Ray tracing is a useful analytic tool for designing optic systems or for analyzing existing systems without the cumbersome wave propagation equations derived from wave theory, electromagnetic theory, or Maxwell's equations. All the light rays are not in fact equal. The rays emanating from the object 26 are not all of equal strength. There is also diffraction at each lens interface and diffraction at each aperture or field stop which causes the light departing from a single point on object 26 to be blended over a region on the focal plane. Each type of diffraction causes the blend to have a different distribution curve with the actual blend being a compound effect and not following any one pure form of diffraction. With reference to FIG. 9, a Gaussian imaging blend and it's effect on an intensity step edge is shown. The curve is a plot of pixel intensity level on the y axis and the discrete pixel location in an image perpendicular to an edge on the x axis.

Each point along the object 26 is smeared in the shape of the Gaussian to yield the blended intensity in an image. The area under the blended curve 80 equals the area under the step curve 82 thus preserving the total light energy in the image. The blended intensity curve is constructed from the sum of the step intensity information distributed by the shown Gaussian curve for each discrete point along the step edge. When the flat portions before and after the step are smeared, the net effect is the same as if no smearing occurred at all. Near the change however, the dispersal of the high intensity portion of the object 26 effects the low intensity portion of the image and vice versa. The best optic systems produce less blend effect, however there is no perfect lens systems (including the human eye) which will yield a step image when given an object with a perfect step change in intensity.

The lens of a typical commercially available camera is a complex optical system. At least three movable lenses are represented in a system where zoom, focus, and macro adjustments are available. Each lens acts as an aperture in that it permits only a circular portion of the light reflected from an object to pass through it. Each pair of lenses, relatively spaced along the camera axis, acts as an aperture limiting the angle of light rays which will successfully pass through both lenses. A variable mechanical aperture is also a part of the complex optics system. The aperture shape is defined by several curved plates arranged in a polygonal fashion. Diffraction is not limited to aperture affects alone, but also occurs at each lens interface further complicating the blend phenomenon. The result is that complex lens systems are difficult to model empirically and instead experimental methods are employed.

Advantageously, blend distribution information can be used to "de-blend" the image and allow the true color of the object be measured. The measurement of object 26 is a structured problem in that the image only varies in one direction (assuming color consistency along the minor or horizontal axis) and the background of the object 26 is under the control of a measurement system designer. As those skilled in the art are aware, dark, light absorbing material should be used for the background in order to minimize the drift (or flare) of camera 14 on the image of object 26. The light absorbing properties of the background will tend to absorb light reflected onto it from object 26 so that the corresponding areas of the image will be stable enough to solve boundary conditions in a system of equations without too many unknowns.

Figure 10:
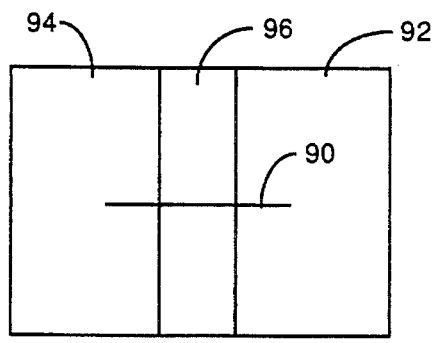
FIG. 10 illustrates an object to be measured against a preferred background in accordance with the invention.

A system of equations can be written for a single horizontal line of the image in FIG. 10. The line 90 has adjacent dark background areas 92, 94 crosses light zone 96 and will be stored in the memory of computer 12 as an array of measured intensity values, $I_m$, which does not need to be as wide as the entire image, but rather extends only into stable background pixels that have had negligible blend from the object 26. The measured array $I_m$ represents the blended information. The desired information is an array of de-blended intensity values which correspond to intensities in the original object, $I_o$. Supposing the blend distribution only has significant effect for n pixels and beyond that the blend effect is negligible, the discretized values for this blend distribution will be stored in a third array B.

A matrix equation 9 which models the blend phenomenon is presented below. The matrix with the B vector coefficients spread across the diagonal is not a square matrix due to the width of the blend distribution. In this example, n+4 values of $I_o$ to produce n values of $I_m$ are required.

$$\begin{bmatrix} B_1 & B_2 & B_3 & B_4 & B_5 & 0 & 0 & 0 & 0 & 0 & 0 \\ 0 & B_1 & B_2 & B_3 & B_4 & B_5 & 0 & 0 & 0 & 0 & 0 \\ 0 & 0 & B_1 & B_2 & B_3 & B_4 & B_5 & 0 & 0 & 0 & 0 \\ 0 & 0 & 0 & B_1 & B_2 & B_3 & B_4 & B_5 & 0 & 0 & 0 \\ 0 & 0 & 0 & 0 & B_1 & B_2 & B_3 & B_4 & B_5 & 0 & 0 \\ 0 & 0 & 0 & 0 & 0 & B_1 & B_2 & B_3 & B_4 & B_5 & 0 \\ 0 & 0 & 0 & 0 & 0 & 0 & B_1 & B_2 & B_3 & B_4 & B_5 \end{bmatrix} \begin{Bmatrix} I_{o,i-5} \\ I_{o,i-4} \\ I_{o,i-3} \\ I_{o,i-2} \\ I_{o,i-1} \\ I_{o,i} \\ I_{o,i+1} \\ I_{o,i+2} \\ I_{o,i+3} \\ I_{o,i+4} \\ I_{o,i+5} \end{Bmatrix} = \begin{Bmatrix} I_{m,i-3} \\ I_{m,i-2} \\ I_{m,i-1} \\ I_{m,i} \\ I_{m,i+1} \\ I_{m,i+2} \\ I_{m,i+3} \end{Bmatrix} \quad (9)$$

To calculate the object 26 intensity vector $I_o$ from the measured intensity vector $I_m$, a simple manipulation using only stable background elements is employed to trim the spread matrix into a square matrix. In this example, elements of both vectors in the i−5, i−4, i−3, i+3, i+4 and i+5 positions are known to be values of the background intensity and can be manipulated. It is noted that in most on-line measurement applications the stable elements will be both farther from the center of object 26 and more numerous. Noting that the B matrix is a banded matrix means 6 terms need to be brought to the other side of the equation leaving a square blend matrix. The banded nature of the blend matrix will simplify the inversion of the matrix, but this is not a critical issue as the blend matrix does not change if the camera optics remain constant. It need only be inverted once. See equation 10.

$$\begin{bmatrix} B_3 & B_4 & B_5 & 0 & 0 & 0 & 0 \\ B_2 & B_3 & B_4 & B_5 & 0 & 0 & 0 \\ B_1 & B_2 & B_3 & B_4 & B_5 & 0 & 0 \\ 0 & B_1 & B_2 & B_3 & B_4 & B_5 & 0 \\ 0 & 0 & B_1 & B_2 & B_3 & B_4 & B_5 \\ 0 & 0 & 0 & B_1 & B_2 & B_3 & B_4 \\ 0 & 0 & 0 & 0 & B_1 & B_2 & B_3 \end{bmatrix}^{-1} \begin{Bmatrix} I_{m,i-3} - B_1 * I_{o,i-5} - B_2 * I_{o,i-4} \\ I_{m,i-2} - B_1 * I_{o,i-4} \\ I_{m,i-1} \\ I_{m,i} \\ I_{m,i+1} \\ I_{m,i+2} - B_5 * I_{o,i+4} \\ I_{m,i+3} - B_4 * I_{o,i+4} - B_5 * I_{o,i+5} \end{Bmatrix} = \begin{Bmatrix} I_{o,i-3} \\ I_{o,i-2} \\ I_{o,i-1} \\ I_{o,i} \\ I_{o,i+1} \\ I_{o,i+2} \\ I_{o,i+3} \end{Bmatrix} \quad (10)$$

The numeric example presented in equations 11 and 12 shows that the original unblended object intensity vector can be readily computed knowing 6 points of the stable background elements. For a wider blend distribution more background points are employed.

$$\begin{bmatrix} .4 & .2 & .1 & 0 & 0 & 0 & 0 \\ .2 & .4 & .2 & .1 & 0 & 0 & 0 \\ .1 & .2 & .4 & .2 & .1 & 0 & 0 \\ 0 & .1 & .2 & .4 & .2 & .1 & 0 \\ 0 & 0 & .1 & .2 & .4 & .2 & .1 \\ 0 & 0 & 0 & .1 & .2 & .4 & .2 \\ 0 & 0 & 0 & 0 & .1 & .2 & .4 \end{bmatrix}^{-1} \begin{Bmatrix} 14 - .1 * 10 - .2 * 10 \\ 22 - .1 * 10 \\ 38 \\ 42 \\ 38 \\ 22 - .1 * 10 \\ 14 - .2 * 10 - .1 * 10 \end{Bmatrix} = \quad (11)$$

$$\begin{Bmatrix} I_{o,i-3} \\ I_{o,i-2} \\ I_{o,i-1} \\ I_{o,i} \\ I_{o,i+1} \\ I_{o,i+2} \\ I_{o,i+3} \end{Bmatrix}$$

$$\begin{bmatrix} 3.46 & -1.8 & -.3 & .75 & -.3 & -.1 & .13 \\ -1.8 & 4.37 & -1.6 & -.7 & .87 & -.2 & -.1 \\ -.3 & -1.6 & 4.39 & -1.7 & -.6 & .87 & -.3 \\ .75 & -.7 & -1.7 & 4.53 & -1.7 & -.7 & .75 \\ -.3 & .87 & -.6 & -1.7 & 4.39 & -1.6 & -.3 \\ -.1 & -.2 & .87 & -.7 & -1.6 & 4.37 & -1.8 \\ .13 & -.1 & -.3 & .75 & -.3 & -1.8 & 3.46 \end{bmatrix} \begin{Bmatrix} 11 \\ 21 \\ 38 \\ 42 \\ 38 \\ 21 \\ 11 \end{Bmatrix} = \begin{Bmatrix} 10 \\ 10 \\ 50 \\ 50 \\ 50 \\ 10 \\ 10 \end{Bmatrix} \quad (12)$$

More decimal places than are shown in equation 12 may be employed. Depending on the stability of the optic system and hence the consistency of the blend distribution this method can be employed quickly in an on-line machine vision colorimetry inspection system. The inverted blend matrix may be as large as 200×200 depending on the magnification settings and the size of object 26 in the image, however this matrix need only be inverted once and the on-line calculation is advantageously obtained by the multiplication of a matrix and a background compensated vector. Another means for deblending the image of object 26 is through the use of the Fourier transformation which is a well known procedure for converting data in the spatial domain to data in the frequency domain. Mathematics in the frequency domain are often simpler than the corresponding computation in the spatial domain. Many common signal processing tasks such as that of a band-pass filter are reduced to simply removing the high and the low frequency terms in the frequency data. An inverse Fourier transformation then produces filtered spatial data.

The removal of the high and low frequency components can be accomplished by multiplying the vector of frequency data by a vector of prepared filter data. The filter data has values of 0 for frequencies that are to be removed and values of 1 for frequencies that are to be retained. The act of multiplying the frequency array by the filter array is called convolving the data and is the same as blending data in the spatial domain. The filter need not be a simple binary array, but instead could be a Fourier transform of one of the blend distributions shown above.

As mentioned hereinbefore, convolution is the literature accepted term for general signal blending. Convolving a wave from fix) by a response curve (blend distribution) g(x) in the spatial domain is the same as multiplying the Fourier transform of the waveform f(x), F(k), by the Fourier transform of the response curve g(x), G(k), to obtain Fourier transform of the convoluted signal h(x), H(k). The inverse Fourier transform of H(k) returns the convoluted signal h(x) in the spatial domain.

If the blend distribution g(x) is known and the digitized output of the video camera 14 is h(x) then the deconvolved signal f(x) can be obtained as follows: Take the Fourier transform of both h(x) and g(x) obtaining H(k) and G(k). Divide H(k) by G(k) to obtain F(k). The inverse Fourier transform of F(k) yields f(x), the deconvolved image.

The blend distribution can be obtained in a similar manner. First capture the image of a known object whose image intensity profile is a square wave and construct a data set f(x) to model that square wave as it should appear without convolution. Next, measure the blended signal h(x) with the video camera 14. Again taking Fourier transformations, dividing H(k) by F(k) will yield G(k), which an inverse Fourier transformation will change to g(x), the blend distribution.

Optic phenomena causes images to be blended, or convolved, by a response curve which is a function of the optics and the wavelength of light. The effect of wavelength can be minimized by deblending or deconvolving each of the red, blue, and green signals separately. The deblending can be accomplished by either the matrix method or the Fourier method as described herein.

Another factor in lens influences is the spectral response. Various glass materials and other lens materials do not pass all wavelengths of light equally. The light frequency transmittance of the various materials is known and can be used as calibration curves for color measurements on an absolute scale. If the measurements of this instrument are used to establish a new standard then this spectral compensation is not necessary. In a preferred embodiment, the lens selection will become a standard part of the camera 14 and, therefore, will not need to be taken into account.

Finally, lens parameters such as aperture, focus, and zoom are all factors which can affect the intensities measured with camera 14. As such the preferred embodiment is a fixed zoom, fixed focus lens with a fixed sized aperture. Several apertures may be required for the instrument to function over the entire range of dark to light and therefore the instrument must be calibrated completely with each aperture.

The next area of potential concern is the influence of the camera on the image produced from object 26. A calibration chart should preferably be constructed and stored in the memory of computer 12, by imaging a set of targets of known luminance, such as neutral gray plaques. This calibration ensures that measurements from one instrument can be compared with those of another when various parts of a final product are manufactured at different locations. Any quantitative measurement of color difference should aim reflect this measurement adjustment.

Stable power supplies and well shielded electronics are provided in the precision instrument. Although some noise will always be present, it may be minimized through measurement averaging.

Filter gels define the R (red), G (green), and B (blue) channel frequency sensitivities of camera 14 and it is desirable that they be as close to human response as possible. Therefore, as those skilled in the art know, the filter gels should be chosen to match the CIE Standard Colorimetic Observer. As the gels define the color standard, it is important that camera-to-camera variation is minimized.

Preferably, camera 14 is of the type that uses a charge coupled device (CCD) chip to sense the image. To correct for pixel-to-pixel sensitivity, measurements should be made so that each pixel is exposed to a consistent intensity illumination while holding all other factors constant. The camera 14 may be mounted on an X-Y positioner so that it can be moved such that each pixel of the camera is exposed to exactly the same illumination. The resulting array of numbers, which may be stored in the memory of computer 12, can be used to weight measurements of objects for pixel variations.

Most commercial cameras have a host of electronic features which "enhance" the video output from the camera. These enhancements represent unwanted changes to the signal when trying to use the camera 14 as a color measuring instrument. Each such feature should be turned off or disabled in employing such cameras in the present invention. The preferred camera 14 will convey only a linearly amplified voltage proportional to the light intensity incident on each pixel element of the camera 14. Enhanced precision can be obtained from the system if the gain can be increased so that a small range of intensities of object 26 can be magnified to occupy the full scale when digitized of 0 to 255 intensity values. This precision enhancement also requires a pedestal control to select the range of intensifies that the camera 14 will be sensitive to. The measurement apparatus of FIG. 1 should have separate pedestal and gain controls for each of the three channels (R,G,B).

The final influences to be compensated for are those of the frame grabber, grabber/digitizer board. A suitable frame grabber is the True Vision® Nu Vista board used in connection with a microcomputer 12, such as the Apple Macintosh, for example. The performance of the Analog-to-Digital (A/D) converters can be measured with precision voltage sources to a higher resolution than the frame-grabbers digitizer. By providing the frame grabber with signals of known voltage at very small increments, one can measure any non-linearity in the digitizer itself. Such measurements may then be employed to correct any future measurements. Under many conditions this calibration is not necessary, and can be considered to be part of the calibration process outlined in the non-linearity calibration of camera 14.

An error may be introduced by the process of digitization itself whereby a continuous spectrum is discretized into 256 individual levels. A higher precision digitizer can minimize this effect. The enhanced gain and pedestal controls outlined herein will also minimize the error introduced by digitization. In the preferred embodiment averaging many measurements to minimize this error is used. Through the use of this averaging, color measurements consistent to less than 0.5 of an intensity level have been achieved.

Finally, irregularities in the camera 14 and frame-grabber synchronization signals can introduce a spatial error. If the timing is not precise then the X-Y positioning in the image can be in error by a corresponding amount. Stable, well grounded electronics and a good common sync signal provided to both the camera and the frame-grabber minimize this source of error.

Figure 11:
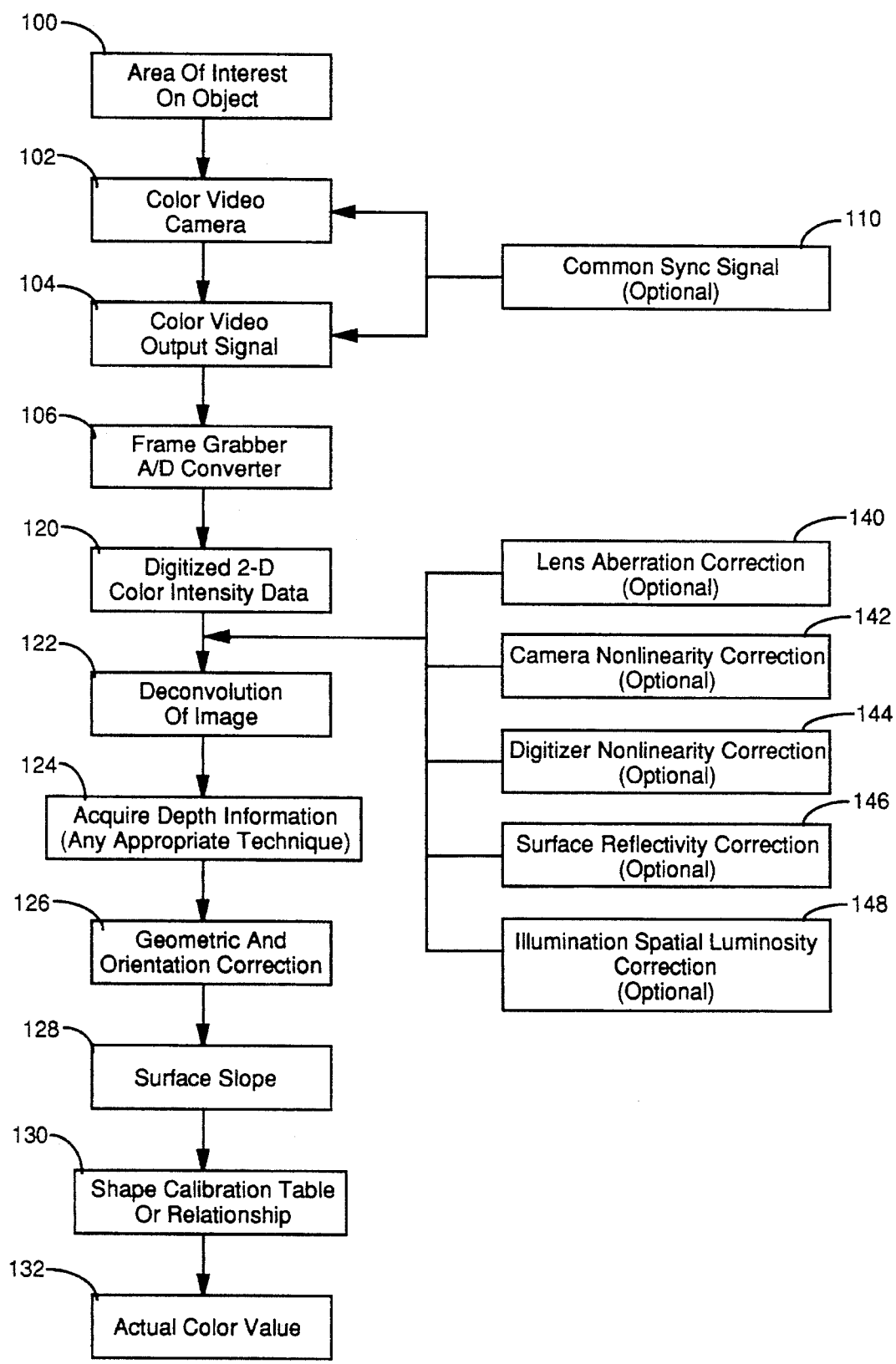
FIG. 11 is a flow chart of a preferred practice of the invention.

Referring to FIG. 11, a preferred overview of the invention will be considered an area of interest 100 of the object being tested is placed within the illumination and in proper position with respect to color video camera 102 The color output signal 104 is directed to the frame grabber 106, wherein the signal is digitized. The common sync signal 110 may optionally be provided to minimize apparent spatial errors due to time offsets in video signals. The digitized 2-D color intensity data 122 is then preferably deconvolved, such as by the matrix or Fourier methods. The deconvolved information is then combined with the acquired depth information 124 to effect geometric and orientation correction 126. The surface slope 128 is determined and the shape calibration table or relationship 130 is employed to make an actual color determination 132. If desired, the emerging deconvolved data may be subjected to one or many levels of correction. For example, correction may be made for (a) lens aberration 140, (b) camera non-linearity 142, (c) digitizer non-linearity 144, (d) surface reflectivity 146 and/or illumination spatial luminosity 148 employing data gathered during initial calibration.

It will be appreciated that the present invention contemplates effecting calibration preferably by employing planar samples having a similar material, color and surface finish as the object to be inspected. A series of measurements with the planar sample oriented at several angles with the series of measurements being stored in the computer memory with reference to the orientation information. In testing an object, which need not be planar, the object is brought within the viewing area of the camera to permit viewing of the area of interest. With suitable illumination impinging on the area of interest, reflected light from the area of interest is focused into an image on the photosensor in the camera. The camera converts the photosensor output into an electrical signal, preferably a standard video signal which is conveyed to the digitizer which is preferably a frame grabber, preferably by wire. The digitizer which may be disposed within the computer converts the analog signal to digital numbers in the computer memory with an array of such numbers representing the image of the reflected light from the object of interest.

The surface configuration of the area being inspected for object orientation with respect to the camera is determined by sensing means which may be part of the processing means 16 (FIG. 1) and introducing the same into the computer 12. Employing the digitized measurement of the area of interest with the surface configuration or orientation information to compare with the stored information regarding the angularly disposed planar samples and modifying the measured color in order to determine the color within the inspected area.

If desired, failure of the color to conform to the desired specification could be employed to activate an audio signal and/or a visual signal.

If desired, this information may be employed to modify the manufacturing process for the product either with human intervention or by means of a servosystem that would automatically alter an upstream manufacturing process. Compensation for at least some of the hereinbefore recited variables are preferably effected in practicing the process.

All the herein discussed factors are compensated for or fit into an intensity array which is used to adjust the measured image color to produce a color as close to absolute as possible.

While deconvolving employing software has been disclosed herein and is presently preferred, it will be appreciated that hardware may be employed to accomplish this step as by the use of suitable filters.

While the preferred use of wires carrying electrical information from the color photosensor to the digitizer has been disclosed, it will be appreciated that the image information may emerge from the color photosensor in other forms, such as (a) an analog output signal, or (b) an optical output transmitted to the computer by fiber optic means, or (c) radio transmitted information may be employed, if desired. With the analog or optical signal approach, deconvolving may be accomplished by the computer without digitizing.

While the disclosure herein has focused on use of the system to measure color of an object and compare the same with a standard without requiting specific orientation of the object, the invention may also be employed to determine what portions of an object must be provided with different colors in order to achieve unique effect. For example, an automobile dashboard may be provided with sections of slightly different color in order that the typical uneven lighting conditions on the dash will produce a uniform appearance across the dashboard.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A method for measuring color of three dimensional objects, said method comprising the steps of:

storing in a computer memory color measurement values of a sample having a color which corresponds to the color of the object to be measured;

said measurement values representative of measurements of the color of said object taken with a color photosensor over a range of orientations of said object with respect to said photosensor;

placing a three dimensional object to be measured within a viewing area of said photosensor;

selecting a measurement area of said three dimensional object to be measured for color by said photosensor;

illuminating said measurement area;

determining a three dimensional geometrical structure of said measurement area relative to said photosensor by surface orientation sensing means operably coupled with said computer, converting said three dimensional geometrical structure into geometric structural information values and storing said geometric structural information values in the memory of said computer;

employing said photosensor to obtain color information from said measurement area, converting said measured color information into color information values and storing said color information values in the memory of said computer; and adjusting in said computer said color information values in response to said stored sample values and said stored geometric structural information values in order to provide an adjusted measured color of said three dimensional object.

2. The method of claim 1 including employing generally planar samples positioned at a number of angled positions in establishing said sample values and employing said method on non-planar objects.

3. The method of claim 2 including convening said measured color information into said color information values by digitizing said measured color information.

4. The method of claim 3, further including the steps of:

comparing said adjusted measured color to a control color;

said control color being stored in said computer memory; and rejecting said three dimensional object when said adjusted measured color is not within a predetermined range of said control color by activating an indicator operably coupled with said computer.

5. The method of claim 4 including employing as said indicator at least one of an audio signal, a visual signal, and a servomechanism for physically removing rejected material from a manufacturing line.

6. The method of claim 3 including employing frame grabber means to effect said digitizing.

7. The method of claim 1 including prior to said adjusting said color information values correcting at least one of illumination influences, object influences, lens influences, color photosensor influences and digitizer influences.

8. The method of claim 7 including correcting for all said influences.

9. The method of claim 7 including correcting said lens influences for at least one of diffraction effects and aberrations in the lens.

10. The method of claim 7 including correcting said illumination influences for at least one of spatial distribution, spectral distribution, and time variant illumination variances.

11. The method of claim 7 including correcting said object influences for surface reflectivity variances.

12. The method of claim 7 including correcting said digitizer influences for at least one of digitizer non-linearity, round-off error, synchronization error, and electronic signal noise variations.

13. The method of claim 7 including correcting said photosensor influences for at least one of photosensor intensity, non-linearity, sensor spatial sensitivity variations and spectral response variations.

14. The method of claim 7 including employing a video camera as a photosensor.

15. The method of claim 7, wherein said storing step further includes the steps of:

measuring aberrations in optics of said photosensor;

storing data representative of said measured aberrations in a computer memory; and correcting the adjusted measure color of said measurement area in response to said stored aberration data.

16. The method of claim 7, wherein said storing step further includes the steps of:

measuring non-linearity in the sensitivity of said photosensor;

storing data representative of said non-linearity in a computer memory; and correcting the adjusted measured color of said measurement area in response to said stored non-linearity data.

17. The method of claim 1, wherein said sample storing step further includes the steps of:

introducing a flat planar sample corresponding to the material of said three dimensional object into said photosensor's viewing range at a known orientation to said photosensor and to said illumination source;

said sample having a substantially similar finish and light reflectance properties relative to said three dimensional object;

obtaining color information regarding said sample at different orientations by said photosensor means;

storing values corresponding to color and orientation of said planar sample in a computer memory; and repeating said introducing, obtaining, and storing steps over a range of orientations to said photosensor and illumination source.

18. The method of claim 17 including employing as said photosensor a camera having lens means and sensor means for receiving an image therefrom.

19. The method of claim 17, wherein said storing step further includes the steps of:

measuring response of said digitizing means with respect to said flat planar sample;

storing data representative of said measured response in a computer memory; and correcting the adjusted measured color of said measurement area in response to said stored measured response data.

20. The method of claim 17 wherein said storing step further includes the steps of:

determining the position of said illumination source with respect to said color photosensor and said three dimensional object;

measuring a spatial luminosity of said illumination source;

storing data representative of said spatial luminosity in a computer memory; and correcting the adjusted measured color of said measurement area in response to said stored spatial luminosity data.

21. The method of claim 1, wherein said storing step further includes:

compiling lookup tables in said computer memory from said stored data.

22. The method of claim 21, wherein said adjusting step further includes:

interpolating between data of said lookup tables when said object orientation does not match orientation data of said lookup tables.

23. The method of claim 1, wherein said photosensor causes convolution of an image of said three dimensional object, said method including the further step of:

deconvoluting said image of said photosensor using at least one of Fourier matrix deconvolution methods and deconvolution filter or grating means.

24. The method of claim 1, said selecting step further including:

selecting said measurement area using said computer.

25. The method of claim 1, wherein said adjusting step further includes:

development of fitted curve/surface through data;

employing said curve/surface when said three dimensional object and said geometric structure does not match said sample data.

26. A method for determining a color value of a three dimensional object relative to a standard set of color values., said method comprising the steps of:

storing said standard color values in a computer memory;

associating each of said stored values with a corresponding angular position of a portion of said three dimensional object relative to a photosensor;

introducing said three dimensional object into a viewing area of said photosensor;

measuring at least a portion of said three dimensional object for color;

determining an angular position of each pixel corresponding to said measured portion relative to said photosensor; and comparing the color value of said corresponding pixel to one of said stored color values at a corresponding angle.

27. The method of claim 26 including employing a said measured portion which corresponds to pixels of a digitizing means operably coupled with said computer and said photosensor.

28. The method of claim 27 including measuring said portion for the colors red, blue and green.

29. The method of claim 27 including deconvolving the image information produced by said photosensor.

30. The method of claim 29 including delivering the image information produced by said photosensor to said computer by at least one of optical signals, analog signals and electrical signals.

31. The method of claim 26, wherein said stored values are stored by the steps of:

introducing a flat planar sample corresponding to said three dimensional object into said photosensor's viewing range at a known orientation to said photosensor and to an illumination source, said sample having a substantially similar finish to the finish of said three dimensional object which is to be measured;

obtaining by said photosensor color information of said sample at different orientations; storing values corresponding to said measured color information and orientation in a computer memory; and repeating said introducing, obtaining and storing steps over a range of orientations to said photosensor and illumination source.

32. The method of claim 31, wherein said storing step further includes the steps of:

employing a video camera as said photosensor;

measuring aberrations in optics of said photosensor;

storing data representative of said aberration in a computer memory; and correcting the color value of said measured portion in response to said stored aberration data.

33. The method of claim 31, wherein said storing step further includes the steps
measuring non-linearity in the sensitivity of said photosensor;
storing data representative of said non-linearity in a computer memory; and
correcting the color value of said measured portion in response to said stored nonlinearity data.

34. The method of claim 31, wherein said computer includes a frame grabber, said storing step further including the steps of:
measuring response of said frame grabber to said photosensor;
storing data representative of said measured response in a computer memory; and
correcting the color value of said measured portion in response to said stored measured response data in Order to calibrate said frame grabber.

35. The method of claim 31, wherein said storing step further includes the steps
determining the position of said illumination source with respect to said photosensor and said three dimensional object;
measuring a spatial luminosity of said illumination source;
storing data representative of said spatial luminosity in a computer memory; and
correcting the color value of said measured portion in response to said stored spatial luminosity data.

36. The method of claim 26 including
rejecting said three dimensional object when said comparison is not within a predetermined range of said stored color values by activating an indicator operably coupled to said computer.

37. The method of claim 26, wherein said storing step further includes:
compiling lookup tables in said computer memory from said stored data.

38. The method of claim 37, wherein said comparing step further includes:
interpolating between data of said lookup tables when said object orientation does not match orientation data of said lookup tables.

39. The method of claim 26, wherein said photosensor causes convolution of an image, said method including the further steps of:
deconvoluting said image of said photosensor using at least one of Fourier and matrix deconvolution methods.

40. The method of claim 26, said selecting step further including:
selecting said measures portion using said computer.

41. A method for measuring the color of three dimensional objects, said method comprising the steps of:
illuminating at least a portion of a three dimensional object with a light source;
viewing at least a section of said illuminated portion with a photosensor wherein said photosensor is at a predetermined position relative to said light source and said three dimensional object;
digitizing said viewed section into corresponding pixel sections with a frame grabber in a computer operably coupled with said photosensor;
determining an angular position of said viewed section corresponding to each of said pixel sections relative to said photosensor and said light source;
storing color data of the color of said three dimensional object in a memory of said computer, wherein said color data corresponds to a range of angular positions of the pixel sections of said three dimensional object with respect to said photosensor; and comparing each of the pixel sections of said digitized section to said stored color data corresponding to said angular position of said viewed section.

42. The method of claim 41, further including the step of:
rejecting said three dimensional object when said comparison is not within a predetermined range of said stored color values by activating an indicator operably coupled with said computer.

43. The method of claim 42, wherein said rejecting step includes:
activating at least one of an audio signal and a visual signal with said computer.

44. The method of claim 41, wherein said storing step further includes the steps of: introducing a flat planar sample corresponding to said three dimensional object into said photosensor's viewing range at a known orientation to said photosensor and to an illumination source, said sample having a substantially similar finish relative to said three dimensional object;
obtaining color information of said sample by said photosensor;
storing values corresponding to said measured color and orientation in a computer memory; and
repeating said introducing obtaining, and storing steps over a range of orientations to said photosensor and illumination source.

45. The method of claim 44, wherein said storing step further includes the steps of:
measuring aberrations in optics of said photosensor;
storing data representative of said aberration measuring in a computer memory; and
correcting the color value of said viewed section in response to said stored aberration data.

46. The method of claim 44, wherein said storing step further includes the steps of:
measuring non-linearity in the sensitivity of said photosensor;
storing data representative of said non-linearity in a computer memory; and
correcting the color value of said viewed section in response to said stored non-linearity data.

47. The method of claim 44, wherein said computer includes a frame grabber, said storing step further including the steps of:
measuring response of said frame grabber to said photosensor;
storing data representative of said measured response in a computer memory; and
correcting the color value of said measured portion in response to said stored measured response data by calibrating said frame grabber.

48. The method of claim 41, wherein said photosensor causes convolution of an image, said method including the further steps of:
deconvoluting said image of said camera using at least one of Fourier and matrix deconvolution methods.

49. An apparatus for measuring the color of three dimensional objects, said apparatus comprising:
photosensor means for viewing at least a portion of a three dimensional object at a known orientation to said three dimensional object and providing color information therefrom;

illuminating means for illuminating at least said viewed portion of said three dimensional object, said illuminating means being at a known orientation to said three dimensional object;

geometrical determining means for determining a three dimensional geometrical structure of said viewed portion of said three dimensional object with respect to said photosensor means;

digitizing means operably coupled with said photosensor means and said geometrical determining means for digitizing said color information provided by said photosensor means and said three dimensional geometrical structure information provided by said geometrical determining means regarding said viewed portion of said three dimensional object; and computer means operably coupled with said digitizing means, said computer means including memory means for storing data representative of the color of a control sample over a range of angular orientations of said control sample with respect to said photosensor means, wherein said computer means adjusts said digitized color information with respect to said stored data and with respect to said three dimensional geometrical structure information in order to provide an adjusted measured color of said three dimensional object.

50. The apparatus of claim 49, wherein said computer means compares said adjusted measured color with a control color;

said control color having corresponding data stored in said memory means; and said apparatus further including rejection means operably coupled with said computer means for rejecting said three-dimensional object when said adjusted measured color is not within a predetermined range of said control color.

51. The apparatus of claim 50, wherein said digitizing means includes a frame grabber for digitizing said viewed portion of said three dimensional object.

52. The apparatus of claim 49, wherein said photosensor means includes a video camera.

53. The apparatus of claim 49, wherein said illuminating means presents a generally constant spatial luminosity with respect to said photosensor means.

54. The apparatus of claim 49, wherein said illuminating means is one taken from the group consisting of a single direct source, multiple direct source, and a diffuse source.

55. The apparatus of claim 49 including deconvolving means for deconvolving said digitized color information.

\* \* \* \* \*

UNITED STATES PATENT AND TRADEMARK OFFICE
CERTIFICATE OF CORRECTION

PATENT NO. : 5,495,429

DATED : February 27, 1996

INVENTOR(S) : ROBERT P.M. CRAVEN et al.

It is certified that error appears in the above-indentified patent and that said Letters Patent is hereby corrected as shown below:

In column 5, line 36, "east" should be --cast--;
          line 62, "art" should be --an--; and
          line 64, "vermin" should be --certain--.

In column 8, line 47, "cuntature" should be --curvature--.

In column 10, line 8, "blurting" should be --blurring--; and
           line 21, "aim" should be --also--.

In column 13, line 62, "convening" should be --converting--.

In column 14, line 26, "fix)" should be --f(x)--.

In column 15, line 14, "aim" should be --also--.

In column 16, line 18, a period --.-- should be inserted after "considered"; and change "an" to --An--.
           line 20, a period --.-- should be inserted after "102".

UNITED STATES PATENT AND TRADEMARK OFFICE
CERTIFICATE OF CORRECTION

PATENT NO. : 5,495,429

DATED : February 27, 1996

INVENTOR(S) : ROBERT P.M. CRAVEN et al.

It is certified that error appears in the above-indentified patent and that said Letters Patent is hereby corrected as shown below:

CLAIM 1, column 18, line 3, a comma --,-- should be inserted after "values".

CLAIM 3, column 18, line 17, "convening" should be --converting--.

CLAIM 15, column 19, line 3, "measure" should be --measured--.

CLAIM 26, column 20, line 14, "values.," should be --values,--.

CLAIM 32, column 20, line 64, "abberation" should be --abberations--.

CLAIM 33, column 21, line 2, --of:-- should be inserted after "steps".

CLAIM 40, column 21, line 52, "measures" should be --measured--.

UNITED STATES PATENT AND TRADEMARK OFFICE
CERTIFICATE OF CORRECTION

PATENT NO. : 5,495,429
DATED : February 27, 1996
INVENTOR(S) : ROBERT P.M. CRAVEN ET AL It is certified that error appears in the above-indentified patent and that said Letters Patent is hereby corrected as shown below:

CLAIM 44, Column 22, line 29, a comma --,-- should be insert after "introducing".

Signed and Sealed this

Eighteenth Day of November 1997

Attest:

Attesting Officer

BRUCE LEHMAN

Commissioner of Patents and Trademarks